United States Patent
Acharya et al.

(10) Patent No.: US 12,061,522 B2
(45) Date of Patent: *Aug. 13, 2024

(54) METHOD AND SYSTEM FOR GROUPING DATA SLICES BASED ON DATA CHANGE RATE FOR DATA SLICE BACKUP GENERATION

(71) Applicant: Dell Products L.P., Round Rock, TX (US)

(72) Inventors: Soumen Acharya, Bangalore (IN); Shelesh Chopra, Bangalore (IN); Upanshu Singhal, Bangalore (IN)

(73) Assignee: DELL PRODUCT L.P., Round Rock, TX (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/872,596

(22) Filed: Jul. 25, 2022

(65) Prior Publication Data

US 2024/0028461 A1 Jan. 25, 2024

(51) Int. Cl.
G06F 11/14 (2006.01)

(52) U.S. Cl.
CPC ...... *G06F 11/1451* (2013.01); *G06F 11/1464* (2013.01); *G06F 2201/84* (2013.01)

(58) Field of Classification Search
CPC ............. G06F 11/1451; G06F 11/1464; G06F 2201/84
See application file for complete search history.

(56) References Cited

U.S. PATENT DOCUMENTS

| | | | |
|---|---|---|---|
| 6,061,770 A | * | 5/2000 | Franklin ............. G06F 11/1466 711/221 |
| 7,606,868 B1 | | 10/2009 | Le et al. |
| 8,078,653 B1 | | 12/2011 | Bisson et al. |
| 8,352,429 B1 | | 1/2013 | Mamidi et al. |
| 10,585,752 B1 | | 3/2020 | Chopra et al. |
| 11,836,350 B1 | | 12/2023 | Chopra et al. |
| 2004/0267838 A1 | | 12/2004 | Curran et al. |

(Continued)

FOREIGN PATENT DOCUMENTS

| | | |
|---|---|---|
| CN | 105446826 A | 3/2016 |
| CN | 114356212 A | 4/2022 |

*Primary Examiner* — Brittany N Allen
*Assistant Examiner* — William P Bartlett
(74) *Attorney, Agent, or Firm* — Chamberlain, Hrdlicka, White, Williams & Aughtry; Aly Z. Dossa

(57) ABSTRACT

Techniques described herein relate to a method for performing pre-backup tasks. The method includes obtaining, by a proxy host, a snapshot request associated with an incremental backup of a file system stored in a network attached storage (NAS) from a backup manager; in response to obtaining the snapshot request: instantiating a NAS container to obtain a snapshot of the file system; providing the snapshot to the NAS container; after providing the snapshot to the NAS container: retrieving a previously generated slice list associated with the file system; identifying, using the slice list, changed data include in the file system; generating change rates associated with each slice; grouping the slices based on the change rates and group criteria to generate slice groups; generating an updated slice list specifying the slices and the slice groups; and providing the updated slice list to the backup manager.

20 Claims, 8 Drawing Sheets

(56) References Cited

U.S. PATENT DOCUMENTS

| | | |
|---|---|---|
| 2004/0268067 A1* | 12/2004 | Yamagami .......... G06F 11/1448 |
| | | 714/E11.13 |
| 2005/0223278 A1 | 10/2005 | Saika |
| 2007/0244938 A1 | 10/2007 | Michael et al. |
| 2008/0027998 A1* | 1/2008 | Hara ..................... G06F 16/183 |
| 2010/0030983 A1 | 2/2010 | Gupta et al. |
| 2010/0049918 A1 | 2/2010 | Noguchi et al. |
| 2010/0070725 A1 | 3/2010 | Prahlad et al. |
| 2010/0262794 A1 | 10/2010 | De et al. |
| 2012/0066681 A1 | 3/2012 | Levy et al. |
| 2012/0254689 A1 | 10/2012 | Resch |
| 2015/0112941 A1 | 4/2015 | Cai et al. |
| 2015/0370652 A1 | 12/2015 | He |
| 2016/0253244 A1 | 9/2016 | Zhang et al. |
| 2018/0173874 A1 | 6/2018 | Muttik |
| 2019/0065275 A1 | 2/2019 | Wong et al. |
| 2020/0004438 A1 | 1/2020 | Jagannatha et al. |
| 2020/0104050 A1 | 4/2020 | Srinivasan et al. |
| 2022/0121525 A1 | 4/2022 | Brenner et al. |
| 2022/0121528 A1 | 4/2022 | Brenner et al. |

* cited by examiner

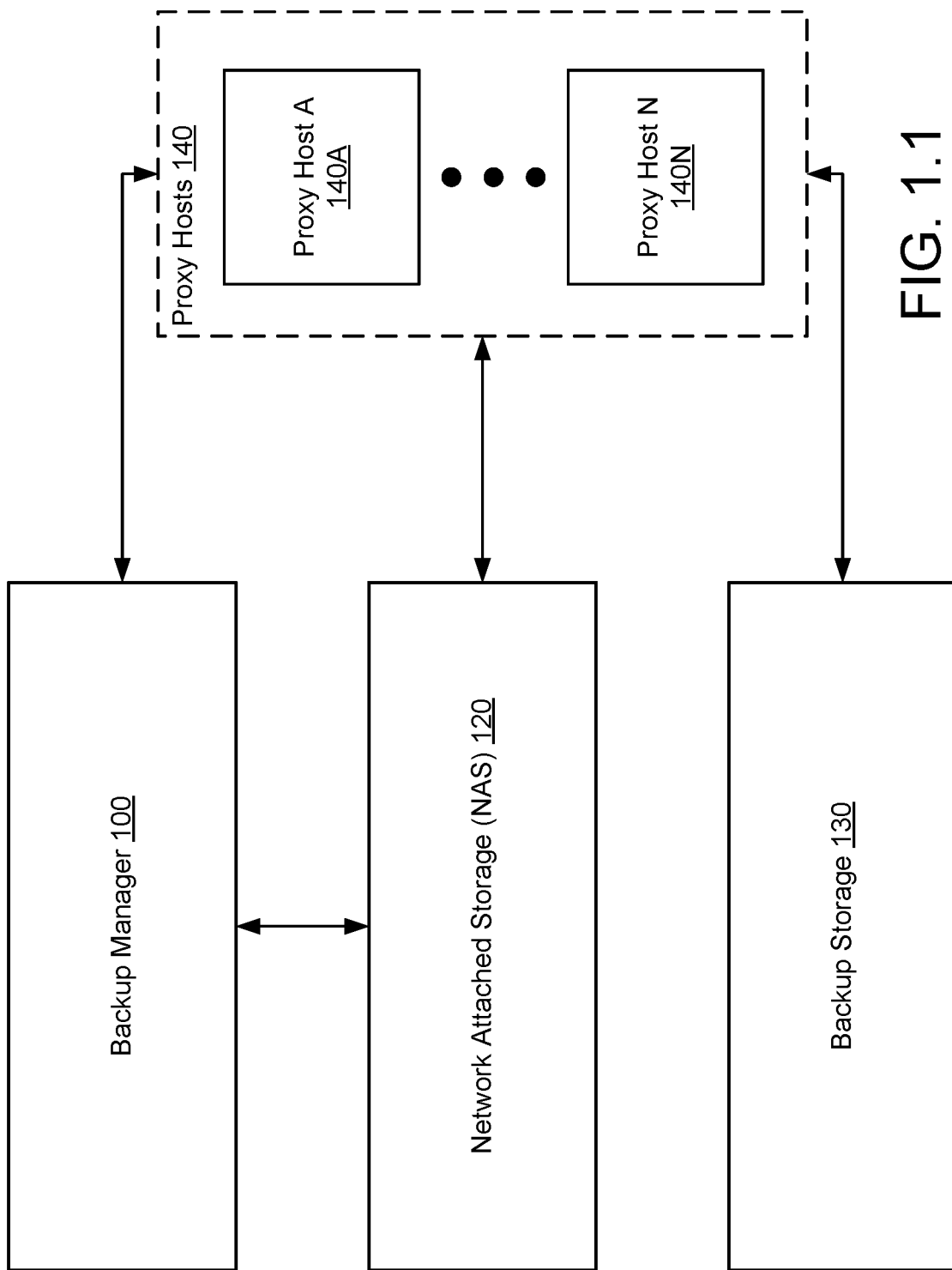
FIG. 1.1

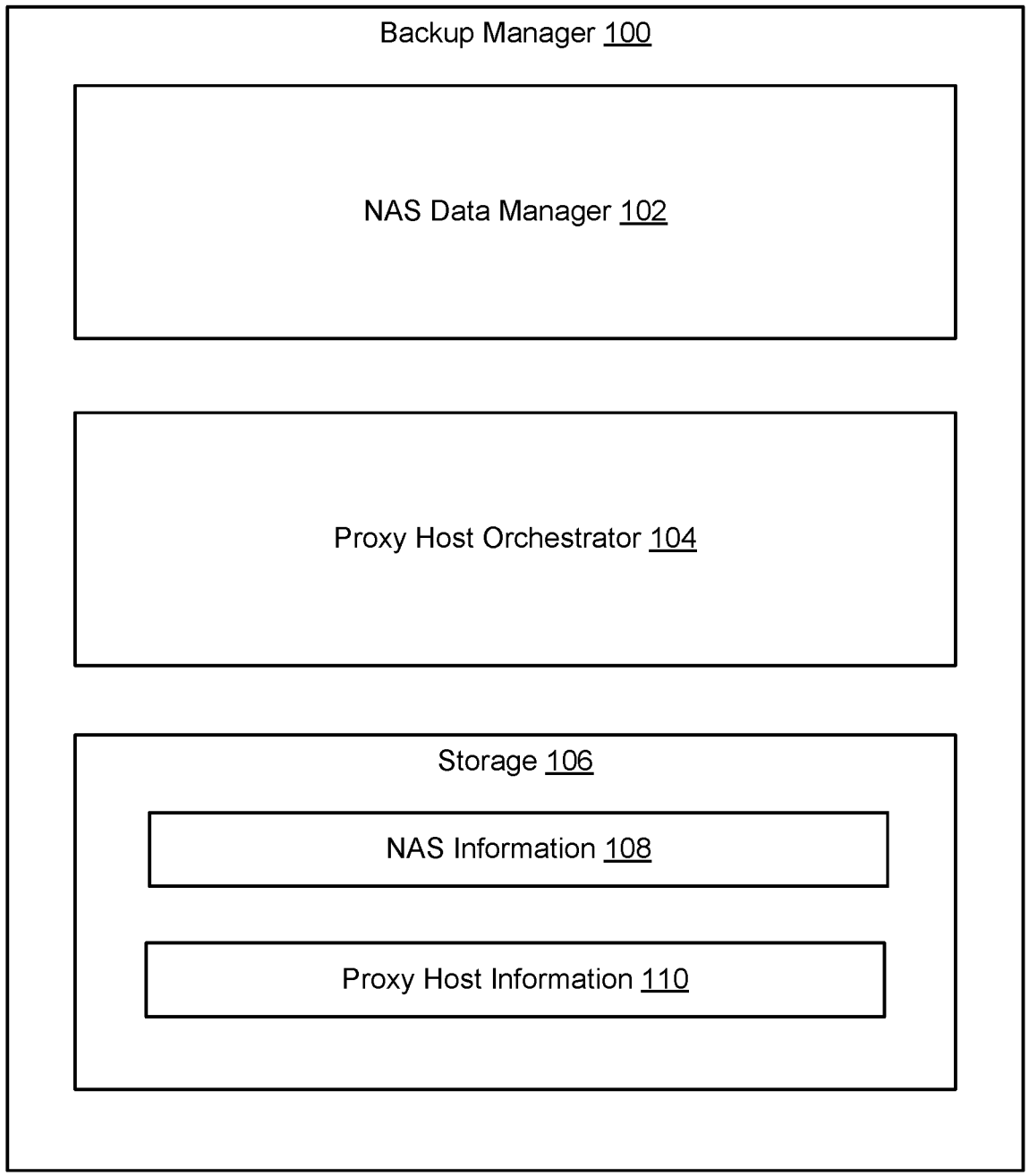
FIG. 1.2

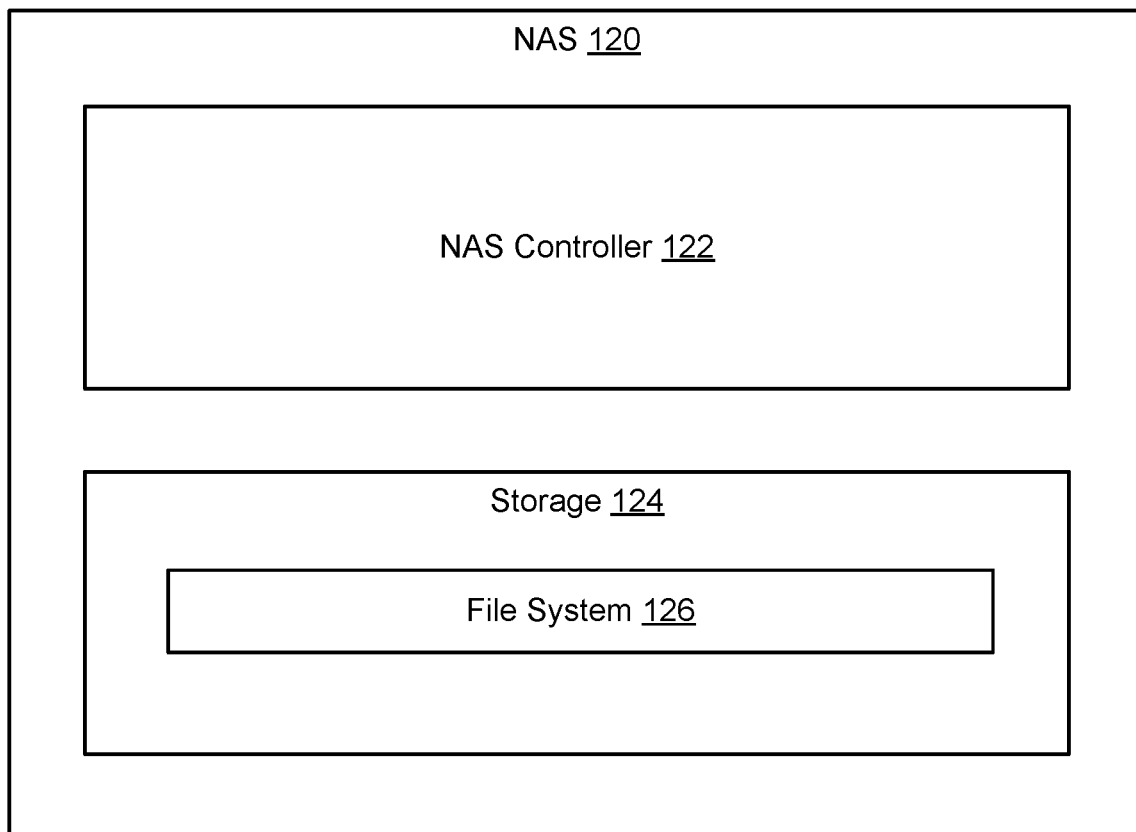
FIG. 1.3

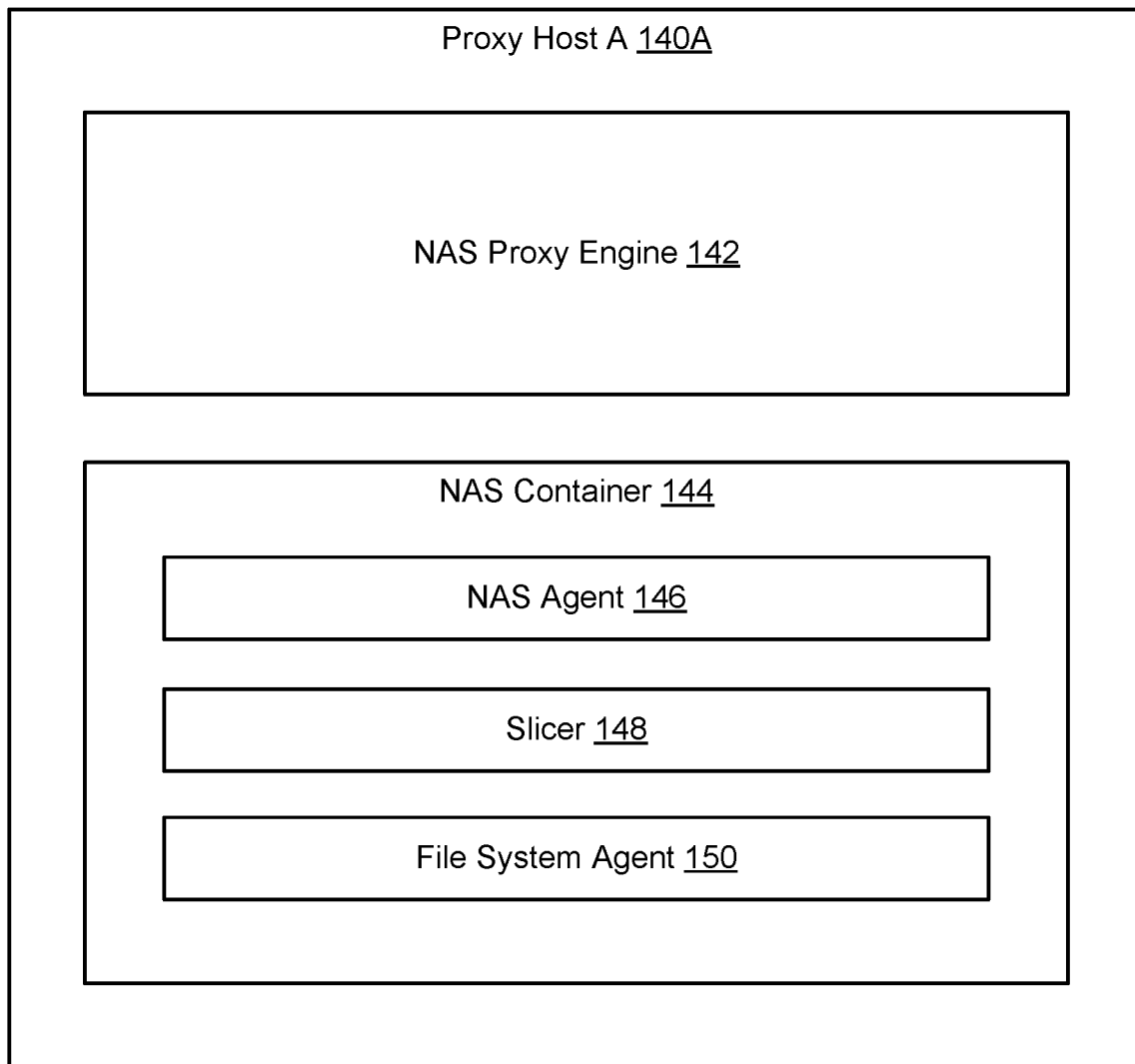
FIG. 1.4

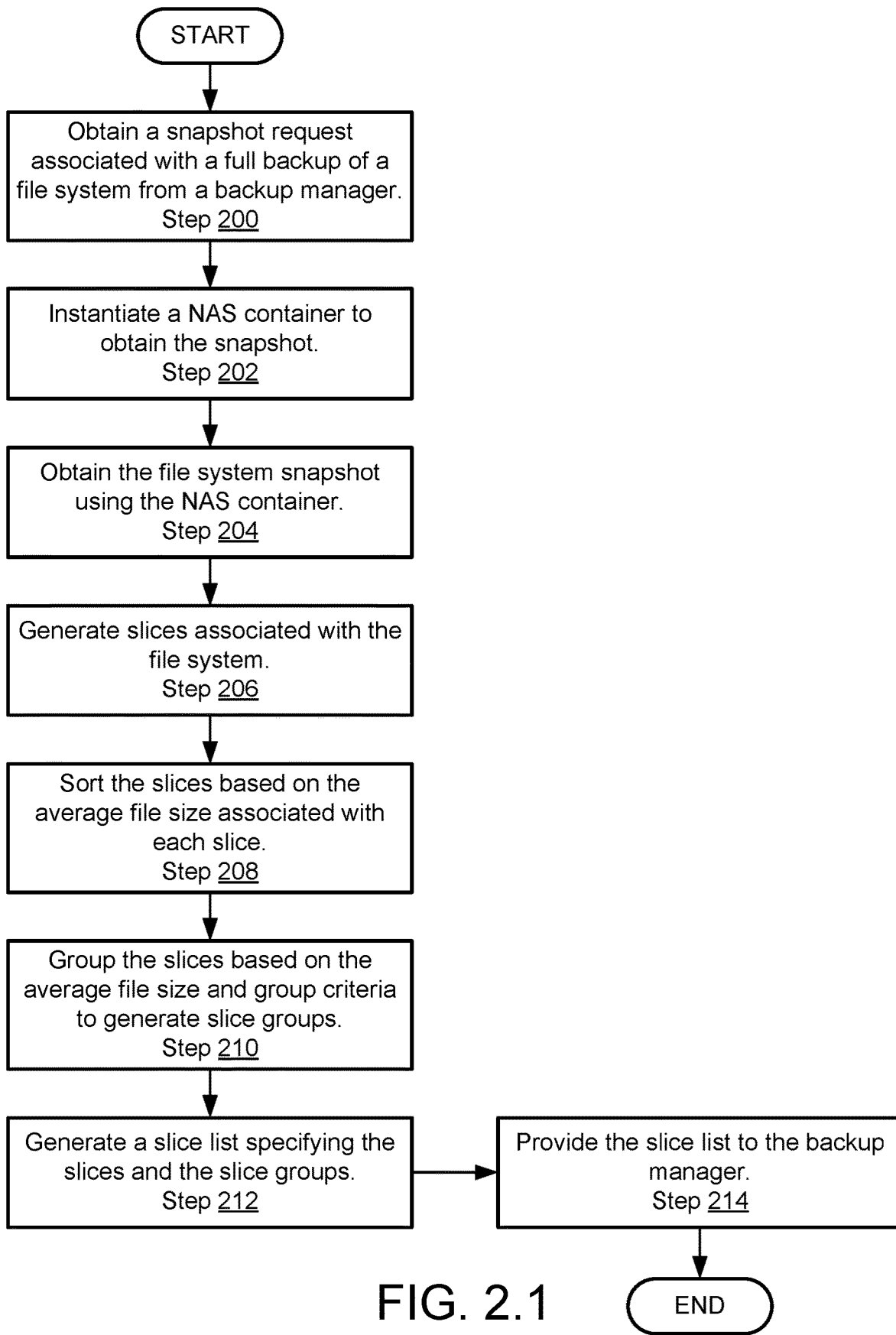
FIG. 2.1

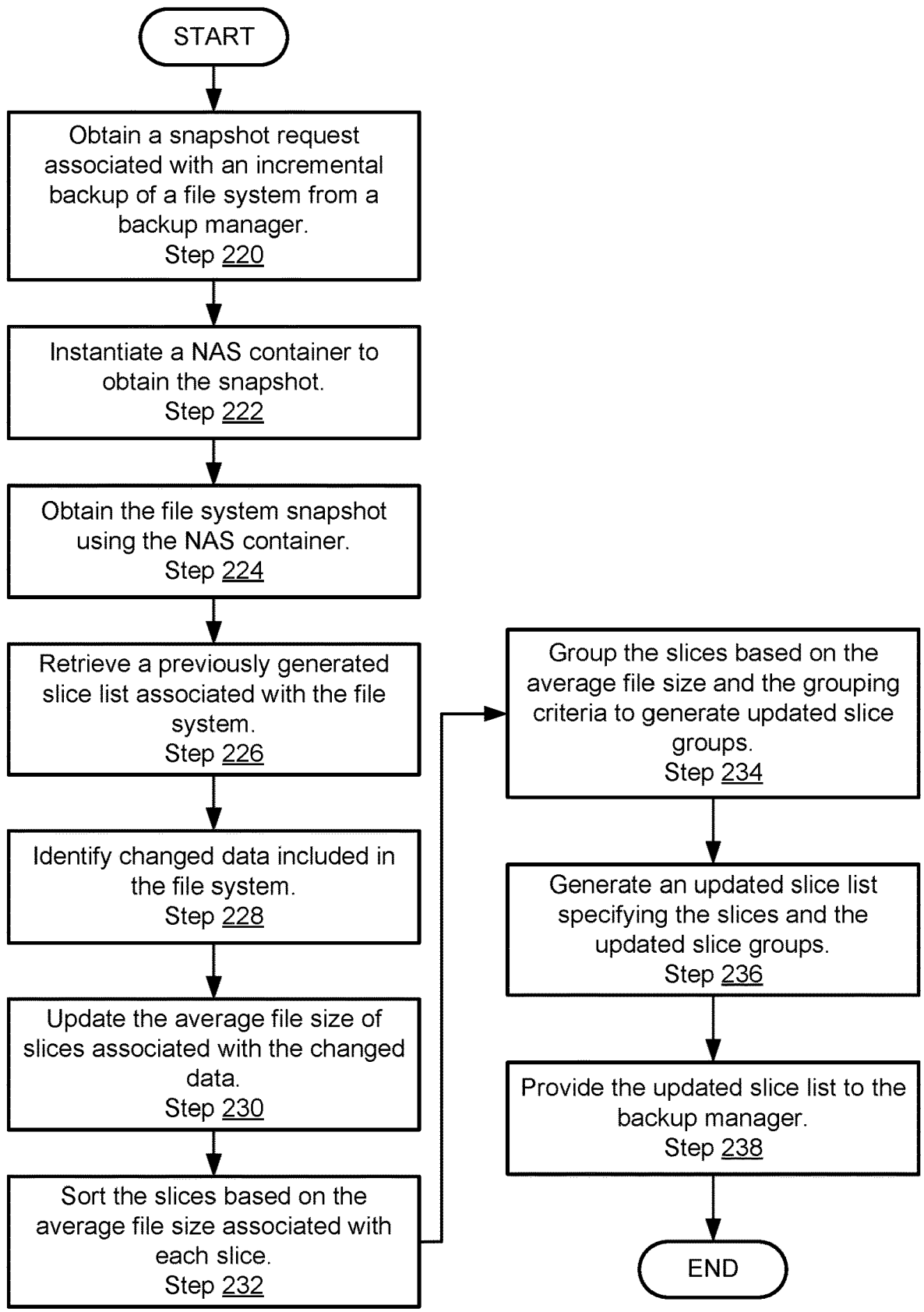
FIG. 2.2

METHOD AND SYSTEM FOR GROUPING DATA SLICES BASED ON DATA CHANGE RATE FOR DATA SLICE BACKUP GENERATION

BACKGROUND

Computing devices may provide services. To provide the services, the computing devices may store data. The data may be stored in a file system. The data stored in the file system may be important to users. To protect the data, backups of the file system may be generated and stored in a backup storage. The file system may be split to improve the performance of file system backups. The split file systems may include different data change rates associated with each split.

SUMMARY

In general, certain embodiments described herein relate to a method for performing pre-backup tasks. The method may include obtaining, by a proxy host, a snapshot request associated with an incremental backup of a file system stored in a network attached storage (NAS) from a backup manager; in response to obtaining the snapshot request: instantiating a NAS container to obtain a snapshot of the file system; providing the snapshot to the NAS container; after providing the snapshot to the NAS container: retrieving a previously generated slice list associated with the file system; identifying, using the slice list, changed data include in the file system; generating change rates associated with each slice; grouping the slices based on the change rates and group criteria to generate slice groups; generating an updated slice list specifying the slices and the slice groups; and providing the updated slice list to the backup manager.

In general, certain embodiments described herein relate to a system for performing pre-backup tasks. The system includes a backup manager and a proxy host of proxy hosts. The proxy host includes a processor and memory, and is programmed to obtain a snapshot request associated with an incremental backup of a file system stored in a network attached storage (NAS) from the backup manager; in response to obtaining the snapshot request: instantiate a NAS container to obtain a snapshot of the file system; provide the snapshot to the NAS container; after providing the snapshot to the NAS container: retrieve a previously generated slice list associated with the file system; identify, using the slice list, changed data include in the file system; generate change rates associated with each slice; group the slices based on the change rates and group criteria to generate slice groups; generate an updated slice list specifying the slices and the slice groups; and providing the updated slice list to the backup manager.

In general, certain embodiments described herein relate to a non-transitory computer readable medium that includes computer readable program code, which when executed by a computer processor enables the computer processor to perform a method for performing pre-backup tasks. The method may include obtaining, by a proxy host, a snapshot request associated with an incremental backup of a file system stored in a network attached storage (NAS) from a backup manager; in response to obtaining the snapshot request: instantiating a NAS container to obtain a snapshot of the file system; providing the snapshot to the NAS container; after providing the snapshot to the NAS container: retrieving a previously generated slice list associated with the file system; identifying, using the slice list, changed data include in the file system; generating change rates associated with each slice; grouping the slices based on the change rates and group criteria to generate slice groups; generating an updated slice list specifying the slices and the slice groups; and providing the updated slice list to the backup manager.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of a backup manager in accordance with one or more embodiments disclosed herein.

FIG. 1.3 shows a diagram of a network-attached storage in accordance with one or more embodiments disclosed herein.

FIG. 1.4 shows a diagram of a proxy host in accordance with one or more embodiments disclosed herein.

FIG. 2.1 shows a flowchart of a method for grouping slices of a file system based on average file size for a full backup in accordance with one or more embodiments disclosed herein.

FIG. 2.2 shows a flowchart of a method for grouping slices of a file system based on average file size for an incremental backup in accordance with one or more embodiments disclosed herein.

DETAILED DESCRIPTION

Figure 3:
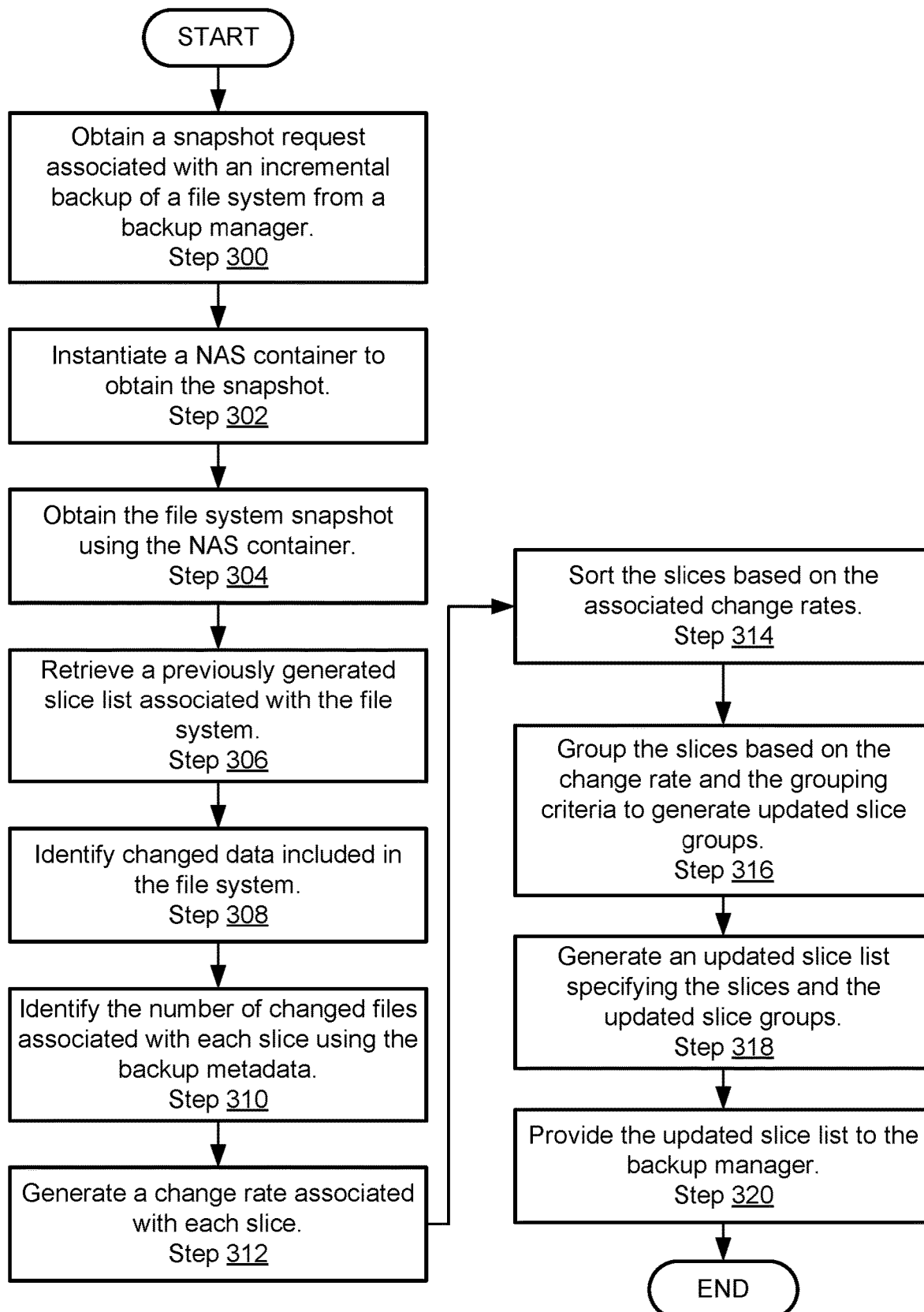
FIG. 3 shows a flowchart of a method for grouping slices of a file system based on change rate for an incremental backup in accordance with one or more embodiments disclosed herein.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, non-transitory computer readable mediums, and methods for managing data slice backups based on grouping prioritization.

In one or more embodiments, traditional systems that include network-attached storages that store file systems may slice the file system to generate slices (also referred to as data slices) during the performance of a backup of the file system. As a result, the slices may be distributed to one or more proxy hosts to perform backup jobs including copying the slices into a backup storage to generate the backup of the file system. Accordingly, first full backups may be efficiently performed. However, the systems may not include the functionality to prioritize the distribution of the slices during backup operations, resulting in potentially inefficient backup operation performance. Additionally, slices generated during the first full backup may be used for each subsequent backup. The systems may not include any functionality to dynamically adjust the slices based on changes to the file system over time. Therefore, depending on the changes to the file system, subsequent backups using the slices may be inflexible and inefficiently performed, negatively impacting the performance of the entire systems.

To address, at least in part, the aforementioned issues, embodiments disclosed herein provide backup orchestration services to manage backups of file systems stored in network-attached storage. Specifically, a system in accordance with embodiments disclosed herein may perform pre-backup tasks to generate snapshots of file systems and generate and/or update slice groups associated with the file system. Priorities specified by user configurable priority criteria may then be used to prioritize the slices included in the slice groups, with each slice in a slice group getting assigned the same priority. The slices may be grouped based on the change rate associated with each of the slices for each incremental backups of the file system. Backup jobs associated with the slices may then be distributed to available proxy hosts to copy snapshot data associated with the slices to the backup storage. Furthermore, a slice queue may be maintained based on the assigned priority in embodiments with limited proxy host availability and/or capacity. Slices with higher priorities may be pulled of the slice queue first and distributed with associated backup jobs to proxy hosts as they become available. Therefore, slices may be dynamically adjusted using the slice groups. As a result, the efficiency and the user customization of backup operations may be improved through the prioritization of the slice groups to generate backups of file systems stored in a network-attached storage over time.

FIG. 1.1 shows a diagram of a system in accordance with one or more embodiments disclosed herein. The system may include a backup manager (100), a network-attached storage (NAS) (120), a backup storage (130), and proxy hosts (140). The backup manager (100) may orchestrate backup operations to generate backups of file systems stored in the NAS (120) using the proxy hosts (140). The resulting backups may be stored in the backup storage (130). The components of the system illustrated in FIG. 1.1 may be operably connected to each other and/or operably connected to other entities (not shown) via any combination of wired and/or wireless networks. Each component of the system illustrated in FIG. 1.1 is discussed below.

The backup manager (100) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2.1-3. The backup manager (100) may be implemented using other types of computing devices without departing from embodiments disclosed herein. For additional details regarding computing devices, refer to FIG. 4.

The backup manager (100) may be implemented using logical devices without departing from embodiments disclosed herein. For example, the backup manager (100) may include virtual machines that utilize computing resources of any number of physical computing devices to provide the functionality of the backup manager (100). The backup manager (100) may be implemented using other types of logical devices without departing from the embodiments disclosed herein.

In one or more embodiments, the backup manager (100) may include the functionality to, or may be otherwise programmed to, perform backup orchestration services for file systems included in the NAS (120). The backup orchestration services may include (i) identifying backup events, (ii) initiating pre-backup tasks to obtain snapshots of the file systems and slice groups associated with the file systems using proxy hosts (140), (iii) assigning priorities to slice groups based on grouping criteria, (iv) distributing backup jobs associated with slice groups to available proxy hosts (140) based on the assigned priorities, and (v) maintaining a slice queue. The backup manager (100) may include the functionality to perform all, or a portion of, the methods of FIGS. 2.1-3. The backup manager (100) may include other and/or additional functionalities without departing from embodiments disclosed herein. For additional information regarding the backup manager (100), refer to FIG. 1.2.

In one or more embodiments, the NAS (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the NAS (120) described herein and/or all, or a portion, of the methods illustrated in FIGS. 2.1-3. The NAS (120) may be implemented using other types of computing devices without departing from the embodiments disclosed herein. For additional details regarding computing devices, refer to FIG. 4.

The NAS (120) may be implemented using logical devices without departing from the embodiments disclosed herein. For example, the NAS (120) may include virtual machines that utilize computing resources of any number of physical computing devices to provide the functionality of the NAS (120). The NAS (120) may be implemented using other types of logical devices without departing from the embodiments disclosed herein.

In one or more embodiments, the NAS (120) may include the functionality to, or otherwise be configured to, store and provide data for users (not shown) of the NAS (120). The NAS (120) may logically store data in one or more file systems. The NAS (120) may include the functionality to perform all, or a portion of, the methods discussed in FIGS. 2.1-3. The NAS (120) may include other and/or additional functionalities without departing from embodiments disclosed herein. For additional information regarding the components of the NAS (120), refer to FIG. 1.3.

In one or more embodiments, the backup storage (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (130) described herein and/or all, or a portion, of the methods illustrated in FIGS. 2.1-3. The backup storage (130) may be implemented using other types of computing devices without departing from the embodiments disclosed herein. For additional details regarding computing devices, refer to FIG. 4.

The backup storage (130) may be implemented using logical devices without departing from the embodiments disclosed herein. For example, the backup storage (130) may include virtual machines that utilize computing resources of any number of physical computing devices to provide the functionality of the backup storage (130). The backup storage (130) may be implemented using other types of logical devices without departing from the embodiments disclosed herein.

In one or more embodiments, the backup storage (130) may include the functionality to, or otherwise be configured to, store and provide data for users (not shown) of the backup storage (130) for data protection and/or archiving purposes. The backup storage (130) may store backups of file systems included in the NAS (120). The backups may include full backups and/or incremental backups. Other and/or additional data may be stored in the backup storage (130) without departing from embodiments disclosed herein. The backup storage (130) may include the functionality to perform all, or a portion of, the methods discussed in FIGS. 2.1-3. The backup storage (130) may include other and/or additional functionalities without departing from embodiments disclosed herein.

In one or more embodiments, proxy hosts (140) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the proxy hosts (140) described herein and/or all, or a portion, of the methods illustrated in FIGS. 2.1-3. The proxy hosts (140) may be implemented using other types of computing devices without departing from the embodiments disclosed herein. For additional details regarding computing devices, refer to FIG. 4.

The proxy hosts (140) may be implemented using logical devices without departing from the embodiments disclosed herein. For example, the proxy hosts (140) may include virtual machines that utilize computing resources of any number of physical computing devices to provide the functionality of the proxy hosts (140). The proxy hosts (140) may be implemented using other types of logical devices without departing from the embodiments disclosed herein.

The proxy hosts (140) may include any quantity of proxy hosts without departing from embodiments disclosed herein. For example, the proxy hosts (140) may include proxy host A (140A) and proxy host N (140N).

In one or more embodiments, the proxy hosts (140) may include the functionality to, or otherwise be configured to, perform pre-backup tasks to obtain snapshots and slice groups of a file system and to perform backup jobs orchestrated by the backup manager (100) to copy slice data to the backup storage (130) to generate file system backups. The proxy hosts (140) may include the functionality to perform all, or a portion of, the methods discussed in FIGS. 2.1-3. The proxy hosts (140) may include other and/or additional functionalities without departing from embodiments disclosed herein. For additional information regarding the proxy hosts (140), refer to FIG. 1.4.

Although the system of FIG. 1.1 is shown as having a certain number of components (e.g., 100, 120, 130, 140A, 140N), in other embodiments disclosed herein, the system may have more or fewer components. For example, the functionality of each component described above may be split across components or combined into a single component (e.g., the functionalities of the backup manager (100) and a proxy host (e.g., 140A) may be combined to be implemented by a single component). Further still, each component may be utilized multiple times to carry out an iterative operation.

FIG. 1.2 shows a diagram of a backup manager (100) in accordance with one or more embodiments disclosed herein. The backup manager (100) may be an embodiment of the backup manager (100, FIG. 1.1) discussed above. As discussed above, the backup manager (100) may include the functionality to perform backup orchestration services. To perform the backup orchestration services, the backup manager (100) may include a NAS data manager (102), a proxy host orchestrator (104), and a storage (120). The backup manager (100) may include other, additional, and/or fewer components without departing from embodiments disclosed herein. Each of the aforementioned components of the backup manager (100) is discussed below.

In one or more embodiments disclosed herein, the NAS data manager (102) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the NAS data manager (102) described throughout this Detailed Description.

In one or more embodiments disclosed herein, the NAS data manager (102) is implemented as computer instructions, e.g., computer code, stored on a persistent storage that when executed by a processor of the backup manager (100) causes the backup manager (100) to provide the functionality of the NAS data manager (102) described throughout this Detailed Description.

In one or more embodiments, the NAS data manager (102) includes the functionality to, or is otherwise configured to, perform a portion of the backup orchestration services of the backup manager (100). The portion of the backup orchestration services performed by the NAS data manager (102) may include (i) identifying backup generation events associated with file systems stored in the NAS (120, FIG. 1.1), (ii) assigning priorities to slice groups based on priority criteria, (iii) distributing backup jobs to available proxy hosts (140, FIG. 1.1) based on priorities, and (iv) managing a slice queue (not shown). The NAS data manager (102) may include the functionality to perform all, or a portion thereof, the steps in the methods depicted in FIGS. 2.1-3. The NAS data manager (102) may include, or be configured to perform, other and/or additional functionalities without departing from embodiments disclosed herein. For additional information regarding the functionality of the NAS data manager (102), refer to FIGS. 2.1-3.

In one or more embodiments disclosed herein, the proxy host orchestrator (104) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the proxy host orchestrator (104) described throughout this Detailed Description.

In one or more embodiments disclosed herein, the proxy host orchestrator (104) is implemented as computer instructions, e.g., computer code, stored on a persistent storage that when executed by a processor of the backup manager (100) causes the backup manager (100) to provide the functionality of the proxy host orchestrator (104) described throughout this Detailed Description.

In one or more embodiments, the proxy host orchestrator (104) includes the functionality to, or is otherwise configured to, perform a portion of the backup orchestration services associated with the proxy hosts (140, FIG. 1.1). The portion of the backup orchestration services performed by the proxy host orchestrator (104) may include (i) identifying available proxy hosts (140, FIG. 1.1), (ii) sending and/or obtaining instructions, requests, and/or information to and from the proxy hosts (140, FIG. 1.1), and (iii) identifying available proxy hosts (140, FIG. 1.1). The proxy host orchestrator (104) may include the functionality to perform all, or a portion thereof, the steps in the methods depicted in FIGS. 2.1-3. The proxy host orchestrator (104) may include or be configured to perform other and/or additional functionalities without departing from embodiments disclosed herein. For additional information regarding the functionality of the proxy host orchestrator (104), refer to FIGS. 2.1-3.

In one or more embodiments, the storage (106) may be implemented using one or more volatile or non-volatile storages or any combination thereof. The storage (106) may include the functionality to, or otherwise be configured to, store information that may be used by the backup manager (100) and the components thereof (e.g., 102, 104) to perform backup orchestration services. The information stored in the storage (106) may include NAS information (108) and proxy host information (110). The storage (106) may store other and/or additional information without departing from embodiments disclosed herein. Each of the aforementioned types of information stored in the storage (106) is discussed below.

In one or more embodiments, the NAS information (108) may include one or more data structures that include information associated with the NAS (120, FIG. 1.1). The NAS information (108) may include file system identifiers (e.g., unique combinations of alphanumeric characters associated with a particular file system) associated with file systems, slice lists associated with the file systems, access information (e.g., network address, IP address, etc.), encryption information (e.g., public keys, digital certificates, etc.), and/or backup metadata (e.g., backup locations, backup timestamps, backup types, etc.) associated with backups of the NAS (120, FIG. 1.1). The NAS information (108) may include other and/or additional information without departing from embodiments disclosed herein. NAS information (108) may be obtained from users of the system, the NAS (120, FIG. 1.1), and/or proxy hosts (140, FIG. 1.1). The NAS information (108) may be used by the NAS data manager (102) and/or the proxy host orchestrator (104) to perform backup orchestration services.

In one or more embodiments, the proxy host information (110) may include one or more data structures that include information associated with the proxy hosts (140, FIG. 1.1). The proxy host information (110) may include proxy host identifiers (e.g., unique combinations of alphanumeric characters associated with a particular proxy host) associated with proxy hosts (140, FIG. 1.1), proxy host capacity information, access information (e.g., network address, IP address, etc.), and/or encryption information (e.g., public keys, digital certificates, etc.). The proxy host capacity information may specify a maximum quantity of backup jobs that a proxy host may be capable of performing and the current number of backup jobs executing on the proxy host. The proxy host information (110) may include other and/or additional information associated with the proxy hosts (140, FIG. 1.1) without departing from embodiments disclosed herein. Proxy host information (110) may be obtained from users of the system and/or proxy hosts (140, FIG. 1.1). The proxy host information (110) may be used by the NAS data manager (102) and/or the proxy host orchestrator (104) to perform backup orchestration services.

While the data structures (e.g., 108, 110) are illustrated as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (106), any of the aforementioned data structures may be stored in different locations (e.g., in storage of other computing devices) and/or spanned across any number of computing devices without departing from embodiments disclosed herein.

FIG. 1.3 shows a diagram of a NAS (120) in accordance with one or more embodiments disclosed herein. The NAS (120) may be an embodiment of the NAS (120, FIG. 1.1) discussed above. As discussed above, the NAS (120) may include the functionality to store and/or provide data of file systems. To perform the aforementioned functionality, the NAS (120) may include a NAS controller (122) and a storage (124). The NAS (120) may include other, additional, and/or fewer components without departing from embodiments disclosed herein. Each of the aforementioned components of the NAS (120) is discussed below.

In one or more embodiments disclosed herein, the NAS controller (122) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the NAS controller (122) described throughout this Detailed Description.

In one or more embodiments disclosed herein, the NAS controller (122) is implemented as computer instructions, e.g., computer code, stored on a persistent storage that when executed by a processor of the NAS (120) causes the NAS (120) to provide the functionality of the NAS controller (122) described throughout this Detailed Description.

In one or more embodiments, the NAS controller (122) includes the functionality to, or is otherwise configured to, perform NAS management services for the NAS (120). The NAS management services may include (i) storing data obtained from users in a file system, (ii) providing data from a file system to users, (iii) generating snapshots of file systems, and (iv) managing file systems. The NAS controller (122) may include the functionality to perform all, or a portion thereof, the steps in the methods depicted in FIGS. 2.1-3. The NAS controller (122) may include, or be configured to perform, other and/or additional functionalities without departing from embodiments disclosed herein. For additional information regarding the functionality of the NAS controller (122), refer to FIGS. 2.1-3.

In one or more embodiments, the storage (124) may be implemented using one or more volatile or non-volatile storages or any combination thereof. The storage (124) may include the functionality to, or otherwise be configured to, store information that may be used by users (not shown) to perform computer implemented services. The information stored in the storage (124) may include a file system (126). The storage may include any quantity of file systems (not shown) without departing from embodiments disclosed herein. The storage (124) may store other and/or additional information without departing from embodiments disclosed herein.

In one or more embodiments, the file system (126) may include one or more data structures that include data generated and used by users. The data stored in the file system (126) may include any type of data without departing from embodiments disclosed herein. For example, the file system (126) may include documents (e.g., text documents, spreadsheets, images, audio data, video data, virtual hard drive data, virtual machine disk data, database data, optical disk images, etc. The file system (126) may store one or more directories and/or files (also referred to as data files) stored in a logical hierarchy. In other words, the file system may include a single root directory that may include other directories and/or files. Each directory may include one or more other directories and/or one or more files. The file system (126) may include other and/or additional information without departing from embodiments disclosed herein.

While the file system (126) is illustrated as a single set of data structures and is discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (124), any of the aforementioned data structures may be stored in different locations (e.g., in storage of other computing devices) and/or spanned across any number of computing devices without departing from embodiments disclosed herein.

FIG. 1.4 shows a diagram of a proxy host in accordance with one or more embodiments disclosed herein. Proxy host A (140A) may be an embodiment of one of the proxy hosts (140, FIG. 1.1) discussed above. As discussed above, proxy host A (140A) may include the functionality to perform pre-backup tasks to obtain snapshots and slice groups of a file system and to perform backup jobs orchestrated by the backup manager (100) to copy slice data to the backup storage (130) to generate file system backups. To perform the aforementioned functionality, proxy host A (140A) may include a NAS proxy engine (142) and a NAS container (144). Proxy host A (140A) may include other, additional, and/or fewer components without departing from embodiments disclosed herein. Each of the aforementioned components of proxy host A (140A) is discussed below.

In one or more embodiments disclosed herein, the NAS proxy engine (142) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the NAS proxy engine (142) described throughout this Detailed Description.

In one or more embodiments disclosed herein, the NAS proxy engine (142) is implemented as computer instructions, e.g., computer code, stored on a persistent storage that when executed by a processor of proxy host A (140A) causes proxy host A (140A) to provide the functionality of the NAS proxy engine (142) described throughout this Detailed Description.

In one or more embodiments, the NAS proxy engine (142) includes the functionality to, or is otherwise configured to, perform proxy host management services for proxy host A (140A). The proxy host management services may include (i) obtaining requests to perform backup jobs and/or pre-backup tasks from the backup manager (100, FIG. 1.1), (ii) obtaining and/or providing information from and/or to backup manager (100, FIG. 1.1), (iii) instantiating NAS container instances (e.g., 144) to perform backup jobs and/or pre-backup tasks, and (iv) removing NAS container instances (e.g., 144) when backup jobs and/or pre-backup tasks are complete. The NAS proxy engine (142) may include the functionality to perform all, or a portion thereof, the steps in the methods depicted in FIGS. 2.1-3. The NAS proxy engine (142) may include, or be configured to perform, other and/or additional functionalities without departing from embodiments disclosed herein. For additional information regarding the functionality of the NAS proxy engine (142), refer to FIGS. 2.1-3.

In one or more embodiments disclosed herein, the NAS container (144) is implemented as computer instructions, e.g., computer code, stored on a storage (not shown) that when executed by a processor of proxy host A (140A) causes proxy host A (140A) to provide the functionality of the NAS container (144) described throughout this Detailed Description.

In one or more embodiments, the NAS container (144) includes the functionality to, or is otherwise configured to, perform backup jobs and/or pre-backup tasks for proxy host A (140A). Proxy host A (140A) may include one or more NAS container instances (e.g., 144) performing backup jobs and/or pre-backup tasks without departing from embodiments disclosed herein. To perform the pre-backup tasks and the backup jobs, the NAS container (144) may include an NAS agent (146), a slicer (148), and a file system agent (150). The NAS agent (146) may include the functionality to provide request to the NAS (120, FIG. 1.1) for snapshots of file system and to obtain the file system snapshots from the NAS (120, FIG. 1.1). The slicer (148) may include the functionality to generate slices of file systems and to generate slice groups by grouping slices of the file systems. The file system agent (150) may include the functionality to copy portions of a file system associated with a slice group to the backup storage (130, FIG. 1.1) to generate a file system backup as part of a backup job. For additional information regarding the functionality of the NAS agent (146), the slicer (148), and the file system agent (150), refer to FIGS. 2.1-3.

Each of the NAS agent (146), the slicer (148), and the file system agent (150) may be programmed to include other and/or additional functionalities without departing from embodiments disclosed herein. Each of the NAS agent (146), the slicer (148), and the file system agent (150) may be implemented as computer instructions, e.g., computer code, stored on a storage that when executed by a processor of proxy host A (140A) causes proxy host A (140A) to provide the functionality of the NAS agent (146), the slicer (148), and the file system agent (150) described throughout this Detailed Description.

FIGS. 2.1-3 show flowcharts of methods in accordance with one or more embodiments disclosed herein. Turning now to FIG. 2.1, FIG. 2.1 shows a flowchart of a method for grouping slices of a file system based on average file size for a full backup in accordance with one or more embodiments disclosed herein. The method shown in FIG. 2.1 may be performed by, for example, a proxy host (e.g., 140A, FIG. 1.1). Other components of the system in FIGS. 1.1-1.4 may perform all, or a portion, of the method of FIG. 2.1 without departing from the scope of the embodiments described herein.

While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a snapshot request associated with a full backup of a file system is obtained from the backup manager. As discussed above with regard to Step 202 of FIG. 2, the proxy host orchestrator of the backup manager may initiate the pre-backup tasks by sending a snapshot request to an available proxy host of the proxy hosts to obtain a snapshot of the file system associated with the backup generation event and to obtain a slice list associated with file system. The snapshot request may include the file system identifier corresponding to the file system associated with the backup generation event. The snapshot request may also specify that the backup type associated with the snapshot request is a full backup. The NAS proxy engine of the proxy host may obtain the request from the backup manager using any appropriate method of data transmission without departing from embodiments disclosed herein. For example, the request may be packetized and transmitted as part of a message through one or more network devices that operatively connect the backup manager and the proxy host. The snapshot request associated with a full backup of a file system may be obtained from the backup manager via other and/or additional methods without departing from embodiments disclosed herein.

In Step 202, a NAS container is instantiated to obtain the snapshot. In one or more embodiments, the NAS proxy engine of the proxy host may instantiate a NAS container instance using computer instructions (e.g., a container image) stored in a storage of the proxy host. The NAS proxy engine may provide the snapshot request to the NAS container to initiate the performance of the pre-backup tasks to obtain the snapshot by the NAS container. A NAS container may be instantiated to obtain the snapshot via other and/or additional methods without departing from embodiments disclosed herein.

In Step 204, the file system snapshot is obtained using the NAS container. In one or more embodiments, the NAS agent of the NAS container sends a request to the NAS to generate a snapshot of the file system associated with the snapshot request. The request may include the file system identifier. In response to obtaining the request, the NAS controller of the NAS may generate a snapshot of the file system associated with the file system identifier and provide the snapshot to the proxy host. The snapshot may then be mounted to the proxy host and obtained by the NAS agent using a mount point associated with the snapshot. The file system snapshot may be obtained using the NAS container via other and/or additional methods without departing from embodiments disclosed herein.

In Step 206, slices associated with the file system are generated. In one or more embodiments, the slicer of the NAS container crawls through the file system snapshot and generates slices of the file system. The slicer may start at one end of the file system and crawl up or down generating slices. For example, the slicer may start at each leaf of the file system (e.g., the lowest director in the logical hierarchy of the file system) and go up to the root directory generating slices of portions of the file system that include up to a configurable data limit or a configurable file limit. For example, for a configurable data limit of 200 gigabytes and a configurable file limit of 1 million files, each slice generated by the slicer may include portions of the file system that include less than or equal to 200 gigabytes or less than or equal to 1 million files. Slices associated with the file system may be generated via other and/or additional methods without departing from embodiments disclosed herein.

In Step 208, the slices are sorted based on the average file size associated with each slice. In one or more embodiments, the slicer may calculate the average file size associated with each generated slice and generate a slice identifier associated with each slice. The slicer may calculate the average file size of a slice by dividing the total size of the data included in the slice (e.g., in gigabytes, megabytes, kilobytes, etc.) by the total number of files included in the slice. After all slices are generated, the slicer may then sort the slices, or the slice identifiers associated with the slices, based on the average file size associated with each slice. The slices may be sorted in ascending order (e.g., the slice with the lowest average file size first and the slice with the highest average file size last). The slices may be sorted based on the average file size associated with each slice via other and/or additional methods without departing from embodiments disclosed herein.

In Step 210, the slices are grouped based on the number of files and group criteria to generate slice groups. In one or more embodiments, the slicer may group the slices based on the average file size associated with each slice using the group criteria. The group criteria may be user configurable group criteria stored in a storage of, or otherwise available to, each proxy host. The user configurable group criteria may specify one or more rules for grouping the slices. The rules for grouping the slices may include ranges of average file sizes of slices associated with each possible slice group that the slices may be grouped into. The slices may be grouped into any number of slice groups as specified by the group criteria without departing from embodiments disclosed herein.

As an example the group criteria may specify three different slice groups. The rules of the group criteria may specify that the first slice group should include slices with average file sizes less than or equal to 32 kilobytes (kB), the second slice group should include slices with average file sizes of more than 32 kB but less than or equal to 128 kB, and the third slice group should include slices with more than 128 kB. Accordingly, the slicer may walk through the sorted slices and assign all slices with an average file size of less than or equal to 32 kB to the first slice group, all slices with an average file size of more than 32 kB but less than or equal to 128 kB to the second slice group, and all slices with an average file size of more than 128 kB to the third slice group. The slices may be grouped based on the average file size and group criteria to generate slice groups via other and/or additional methods without departing from embodiments disclosed herein.

In Step 212, a slice list specifying the slices and the slice groups is generated. In one or more embodiments, the slicer generates the slice list using the slices and the generated slice groups. The slice list may refer to one or more data structures that include a list of slice identifiers corresponding to the generated slices. Each of the slice identifiers may be associated with a group identifier corresponding to a generated slice group. The slice list may also include the total size, the number of files, and the average file size associated with each slice group. The slice list may also specify the contents associated with each slice (e.g., one or more directory identifiers and/or one or more file identifiers). The slice list may further include the file system identifier corresponding to the file system associated with the snapshot used to generate the slices, and a creation timestamp specifying the point in time associated with the generation of the slice list. The slice list may include other and/or additional information without departing from embodiments disclosed herein. The slice list specifying the slices and the slice groups may be generated via other and/or additional methods without departing from embodiments disclosed herein.

In Step 214, the slice list is provided to the backup manager. In one or more embodiments, the slicer provides the slice list to the backup manager. The slice list may be provided to the backup manager using any appropriate method of data transformation without departing from embodiments disclosed herein. For example, the slice list may be included in a message as one or more packets which is transmitted to the backup manager through one or more network devices that operatively connect the proxy host to the backup manager. The slice list may be provided to the backup manager via other and/or additional methods without departing from embodiments disclosed herein.

In one or more embodiments disclosed herein, the method ends following Step 214.

Turning now to FIG. 2.2, FIG. 2.2 shows a flowchart of a method for grouping slices of a file system based on average file size for an incremental backup in accordance with one or more embodiments disclosed herein. The method shown in FIG. 2.2 may be performed, for example, a proxy host (e.g., 140A, FIG. 1.1). Other components of the system in FIGS. 1.1-1.4 may perform all, or a portion, of the method of FIG. 2.2 without departing from the scope of the embodiments described herein.

While FIG. 2.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a snapshot request associated with an incremental backup of a file system is obtained from the backup manager. As discussed above with regard to Step 202 of FIG. 2, the proxy host orchestrator of the backup manager may initiate the pre-backup tasks by sending a snapshot request to an available proxy host of the proxy hosts to obtain a snapshot of the file system associated with the backup generation event and to obtain a slice list associated with file system. The snapshot request may include the file system identifier corresponding to the file system associated with the backup generation event. The snapshot request may also specify that the backup type associated with the snapshot request is an incremental backup. The NAS proxy engine of the proxy host may obtain the request from the backup manager using any appropriate method of data transmission without departing from embodiments disclosed herein. For example, the request may be packetized and transmitted as part of a message through one or more network devices that operatively connect the backup manager and the proxy host. The snapshot request associated with a full backup of a file system may be obtained from the backup manager via other and/or additional methods without departing from embodiments disclosed herein.

In Step 222, a NAS container is instantiated to obtain the snapshot. In one or more embodiments, the NAS proxy engine of the proxy host may instantiate a NAS container instance using computer instructions (e.g., a container image) stored in a storage of the proxy host. The NAS proxy engine may provide the snapshot request to the NAS container to initiate the performance of the pre-backup tasks to obtain the snapshot by the NAS container. A NAS container may be instantiated to obtain the snapshot via other and/or additional methods without departing from embodiments disclosed herein.

In Step 224, the file system snapshot is obtained using the NAS container. In one or more embodiments, the NAS agent of the NAS container sends a request to the NAS to generate a snapshot of the file system associated with the snapshot request. The request may include the file system identifier. In response to obtaining the request, the NAS controller of the NAS may generate a snapshot of the file system associated with the file system identifier and provide the snapshot to the proxy host. The snapshot may then be mounted to the proxy host and obtained by the NAS agent using a mount point associated with the snapshot. The file system snapshot may be obtained using the NAS container via other and/or additional methods without departing from embodiments disclosed herein.

In Step 226, a previously generated slice list associated with the file system is obtained. In one or more embodiments, the NAS agent of the NAS container sends a request to the backup manager for a previously generated slice list associated with the file system. The request may include the file system identifier associated with the file system. In response to obtaining the request, the NAS data manager of the backup manager may retrieve the most recently generated slice list associated with the file system using the file system identifier and may then provide the previously generated slice list to the NAS agent of the NAS container. The request and the previously generated slice list may be transmitted between the backup manager and the proxy host using any appropriate method of data transmission without departing from embodiments disclosed herein. For example, the previously generated slice list and the request may be included in messages as one or more packets which are transmitted between the backup manager and the proxy host through one or more network devices that operatively connect the proxy host to the backup manager. A previously generated slice list associated with the file system may be obtained via other and/or additional methods without departing from embodiments disclosed herein.

In Step 228, changed data included in the file system is identified. In one or more embodiments, the slicer identifies the changed data included in the file system using the previously generated slice list and the snapshot of the file system. The previously generated slice list may include a creation timestamp specifying the point in time that the previously generated slice list was generated. The file system snapshot may include file system metadata specifying last modified timestamps associated with the file system components (e.g., directories and/or files). The last modified timestamp may specify the point in time in which a component of the file system was last modified (e.g., changed, created, modified, moved, removed, etc.). The slicer may compare the last modified timestamps associated with the file system components with the creation time associated with the previously generated slice list to identify changed data in the file system. The slicer may identify slices specified by the previously generated slice list that include changed data. Changed data included in the file system may be identified via other and/or additional methods without departing from embodiments disclosed herein.

In one or more embodiments, if the slicer does not identify any changed data (e.g., if the file system has not changed since the previous backup of the file system was generated), then the method may end following Step 228.

In Step 230, the average file size of the slices associated with the changed data are updated. As discussed above, the slicer may identify the slices that include changed data using the previously generated slice list. The slicer may then recalculate the average file size of the identified slices to update the average file size of the slices associated with the changed data. The average file size of the slices associated with the changed data may be updated via other and/or additional methods without departing from embodiments disclosed herein.

In Step 232, the slices are sorted based on the number of files included in each slice. In one or more embodiments, after updating the average file size of each slice associated with changed data, the slicer may then sort the slices, or the slice identifiers associated with the slices, based on the average file size associated with each slice. The slices may be sorted in ascending order (e.g., the slice with the lowest average file size first and the slice with the highest average file size last). The slices may be sorted based on the average file size associated with each slice via other and/or additional methods without departing from embodiments disclosed herein.

In Step 234, the slices are grouped based on the number of files and group criteria to generate updated slice groups. In one or more embodiments, the slicer may group the slices based on the average file size associated with each slice using the group criteria. The group criteria may be user configurable group criteria stored in a storage of, or otherwise available to, each proxy host. The user configurable group criteria may specify one or more rules for grouping the slices. The rules for grouping the slices may include ranges of average file sizes of slices associated with each possible slice group that the slices may be grouped into. The slices may be grouped into any number of slice groups as specified by the group criteria without departing from embodiments disclosed herein.

As an example the group criteria may specify three different slice groups. The rules of the group criteria may specify that the first slice group should include slices with average file sizes less than or equal to 32 kilobytes (kB), the second slice group should include slices with average file sizes of more than 32 kB but less than or equal to 128 kB, and the third slice group should include slices with more than 128 kB. Accordingly, the slicer may walk through the sorted slices and assign all slices with an average file size of less than or equal to 32 kB to the first slice group, all slices with an average file size of more than 32 kB but less than or equal to 128 kB to the second slice group, and all slices with an average file size of more than 128 kB to the third slice group. The slices may be grouped based on the average file size and group criteria to generate slice groups via other and/or additional methods without departing from embodiments disclosed herein.

In Step 236, an updated slice list specifying the slices and the updated slice groups is generated. In one or more embodiments, the slicer generates the updated slice list using the slices and the generated slice groups. The updated slice list may refer to one or more data structures that include a list of slice identifiers corresponding to the generated slices. Each of the slice identifiers may be associated with a group identifier corresponding to a generated slice group. The updated slice list may also include the number of files, the average file size, and the total size associated with each slice in the slice groups. The updated slice list may also specify the contents associated with each slice (e.g., one or more directory identifiers and/or one or more file identifiers). The updated slice list may further include the file system identifier corresponding to the file system associated with the snapshot used to generate the slices, and a creation timestamp specifying the point in time associated with the generation of the updated slice list. The updated slice list may include other and/or additional information without departing from embodiments disclosed herein. The updated slice list specifying the slices and the slice groups may be generated via other and/or additional methods without departing from embodiments disclosed herein.

In Step 238, the updated slice list is provided to the backup manager. In one or more embodiments, the slicer provides the updated slice list to the backup manager. The updated slice list may be provided to the backup manager using any appropriate method of data transformation without departing from embodiments disclosed herein. For example, the updated slice list may be included in a message as one or more packets which is transmitted to the backup manager through one or more network devices that operatively connect the proxy host to the backup manager. The updated slice list may be provided to the backup manager via other and/or additional methods without departing from embodiments disclosed herein.

In one or more embodiments disclosed herein, the method ends following Step 238.

Turning now to FIG. 3, FIG. 3 shows a flowchart of a method for grouping slices of a file system based on data type for an incremental backup in accordance with one or more embodiments disclosed herein. The method shown in FIG. 3 may be performed, for example, a proxy host (e.g., 140A, FIG. 1.1). Other components of the system in FIGS.

1.1-1.4 may perform all, or a portion, of the method of FIG. 3 without departing from the scope of the embodiments described herein.

While FIG. 3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a snapshot request associated with an incremental backup of a file system is obtained from the backup manager. As discussed above with regard to Step 202 of FIG. 2, the proxy host orchestrator of the backup manager may initiate the pre-backup tasks by sending a snapshot request to an available proxy host of the proxy hosts to obtain a snapshot of the file system associated with the backup generation event and to obtain a slice list associated with file system. The snapshot request may include the file system identifier corresponding to the file system associated with the backup generation event. The snapshot request may also specify that the backup type associated with the snapshot request is an incremental backup. The NAS proxy engine of the proxy host may obtain the request from the backup manager using any appropriate method of data transmission without departing from embodiments disclosed herein. For example, the request may be packetized and transmitted as part of a message through one or more network devices that operatively connect the backup manager and the proxy host. The snapshot request associated with a full backup of a file system may be obtained from the backup manager via other and/or additional methods without departing from embodiments disclosed herein.

In Step 302, a NAS container is instantiated to obtain the snapshot. In one or more embodiments, the NAS proxy engine of the proxy host may instantiate a NAS container instance using computer instructions (e.g., a container image) stored in a storage of the proxy host. The NAS proxy engine may provide the snapshot request to the NAS container to initiate the performance of the pre-backup tasks to obtain the snapshot by the NAS container. A NAS container may be instantiated to obtain the snapshot via other and/or additional methods without departing from embodiments disclosed herein.

In Step 304, the file system snapshot is obtained using the NAS container. In one or more embodiments, the NAS agent of the NAS container sends a request to the NAS to generate a snapshot of the file system associated with the snapshot request. The request may include the file system identifier. In response to obtaining the request, the NAS controller of the NAS may generate a snapshot of the file system associated with the file system identifier and provide the snapshot to the proxy host. The snapshot may then be mounted to the proxy host and obtained by the NAS agent using a mount point associated with the snapshot. The file system snapshot may be obtained using the NAS container via other and/or additional methods without departing from embodiments disclosed herein.

In Step 306, a previously generated slice list and backup metadata associated with the file system are obtained. In one or more embodiments, the NAS agent of the NAS container sends a request to the backup manager for a previously generated slice list associated with the file system. The request may include the file system identifier associated with the file system. In response to obtaining the request, the NAS data manager of the backup manager may retrieve the most recently generated slice list associated with the file system using the file system identifier and may then provide the previously generated slice list to the NAS agent of the NAS container. The request and the previously generated slice list may be transmitted between the backup manager and the proxy host using any appropriate method of data transmission without departing from embodiments disclosed herein. For example, the previously generated slice list and the request may be included in messages as one or more packets which are transmitted between the backup manager and the proxy host through one or more network devices that operatively connect the proxy host to the backup manager. A previously generated slice list associated with the file system may be obtained via other and/or additional methods without departing from embodiments disclosed herein.

In one or more embodiments, the file system agent of the NAS container sends a request to the backup storage for previously generated backup metadata associated with the file system. The request may include the file system identifier associated with the file system. In response to obtaining the request, the NAS data manager of the backup storage may retrieve the most recently generated backup metadata associated with the file system using the file system identifier and may then provide the previously generated slice list to the file system agent of the NAS container. The request and the previously generated backup metadata may be transmitted between the backup storage and the proxy host using any appropriate method of data transmission without departing from embodiments disclosed herein. For example, the previously generated backup metadata and the request may be included in messages as one or more packets which are transmitted between the backup storage and the proxy host through one or more network devices that operatively connect the proxy host to the backup storage. Previously generated backup metadata associated with the file system may be obtained via other and/or additional methods without departing from embodiments disclosed herein.

In Step 308, the changed data included in the file system is identified using the previously generated slice list. In one or more embodiments, the slicer identifies the changed data included in the file system using the previously generated slice list and the snapshot of the file system. The previously generated slice list may include a creation timestamp specifying the point in time that the previously generated slice list was generated. The file system snapshot may include file system metadata specifying last modified timestamps associated with the file system components (e.g., directories and/or files). The last modified timestamp may specify the point in time in which a component of the file system was last modified (e.g., changed, created, modified, moved, removed, etc.). The slicer may compare the last modified timestamps associated with the file system components with the creation time associated with the previously generated slice list to identify changed data in the file system. The slicer may identify slices specified by the previously generated slice list that include changed data. Changed data included in the file system may be identified via other and/or additional methods without departing from embodiments disclosed herein.

In Step 310, the number of changed files associated with each slice is identified. In one or more embodiments, the slicer calculates the number of changed files for each slice specified by the pervious slice list using the creation timestamp and the last modified timestamps as discussed above. For each slice, the slicer may identify files associated with a last modified timestamp that is later than the creation timestamp of the previously generated slice list. The slicer may sum the changed files for each slice to identify the number of changes files. The number of changed files included in each slice may be identified via other and/or additional methods without departing from embodiments disclosed herein.

In Step 312, a change rate associated with each slice is generated. In one or more embodiments, the slicer may generate a change rate (also referred to as data change rate) associated with each slice by dividing the number of changed files by the total number of files associated with each slice specified by the previously generated slice list and multiplying the result by 100 (e.g., to obtain a percentage). The change rate associated with each slice may be generated via other and/or additional methods without departing from embodiments disclosed herein.

In Step 314, the slices are sorted based on the change rate associated with each slice. In one or more embodiments, after generating the change rate associated with each slice, the slicer may then sort the slices, or the slice identifiers associated with the slices, based on the change rate associated with each slice. The slices may be sorted in ascending order (e.g., the slice with the lowest change rate first and the slice with the highest change rate last). The slices may be sorted based on the change rate associated with each slice via other and/or additional methods without departing from embodiments disclosed herein.

In Step 316, the slices are grouped based on the change rates and group criteria to generate slice groups. In one or more embodiments, the slicer may group the slices based on the change rates associated with each slice using the group criteria. The group criteria may be user configurable group criteria stored in a storage of, or otherwise available to, each proxy host. The user configurable group criteria may specify one or more rules for grouping the slices. The rules for grouping the slices may include ranges of change rates associated with each possible slice group that the slices may be grouped into. The slices may be grouped into any number of slice groups as specified by the group criteria without departing from embodiments disclosed herein.

As an example the group criteria may specify three different slice groups. The rules of the group criteria may specify that the first slice group should include slices with change rates above 20%, the second slice group should include slices with change rates less than or equal to 20% but greater than 10%, and the third slice group should include slices with change rates less than or equal to 10%. Accordingly, the slicer may walk through the sorted slices and assign all slices with a change rate above 20% to the first slice group, all slices with a change rate less than or equal to 20% but greater than 10% to the second slice group, and all slices with a change rate less than or equal to 10% to the third slice group. The slices may be grouped based on the change rates and group criteria to generate slice groups via other and/or additional methods without departing from embodiments disclosed herein.

In Step 318, an updated slice list specifying the slices and the slice groups is generated. In one or more embodiments, the slicer generates the updated slice list using the slices and the generated slice groups. The updated slice list may refer to one or more data structures that include a list of slice identifiers corresponding to the generated slices. Each of the slice identifiers may be associated with a group identifier corresponding to a generated slice group. The updated slice list may also include the number of files, the average file size, the data type, the change rate, and the total size associated with each slice in the slice groups. The updated slice list may also specify the contents associated with each slice (e.g., one or more directory identifiers and/or one or more file identifiers). The updated slice list may further include the file system identifier corresponding to the file system associated with the snapshot used to generate the slices, and a creation timestamp specifying the point in time associated with the generation of the updated slice list. The updated slice list may include other and/or additional information without departing from embodiments disclosed herein. The updated slice list specifying the slices and the slice groups may be generated via other and/or additional methods without departing from embodiments disclosed herein.

In Step 320, the updated slice list is provided to the backup manager. In one or more embodiments, the slicer provides the updated slice list to the backup manager. The updated slice list may be provided to the backup manager using any appropriate method of data transformation without departing from embodiments disclosed herein. For example, the updated slice list may be included in a message as one or more packets which is transmitted to the backup manager through one or more network devices that operatively connect the proxy host to the backup manager. The updated slice list may be provided to the backup manager via other and/or additional methods without departing from embodiments disclosed herein.

In one or more embodiments disclosed herein, the method ends following Step 322.

Figure 4:
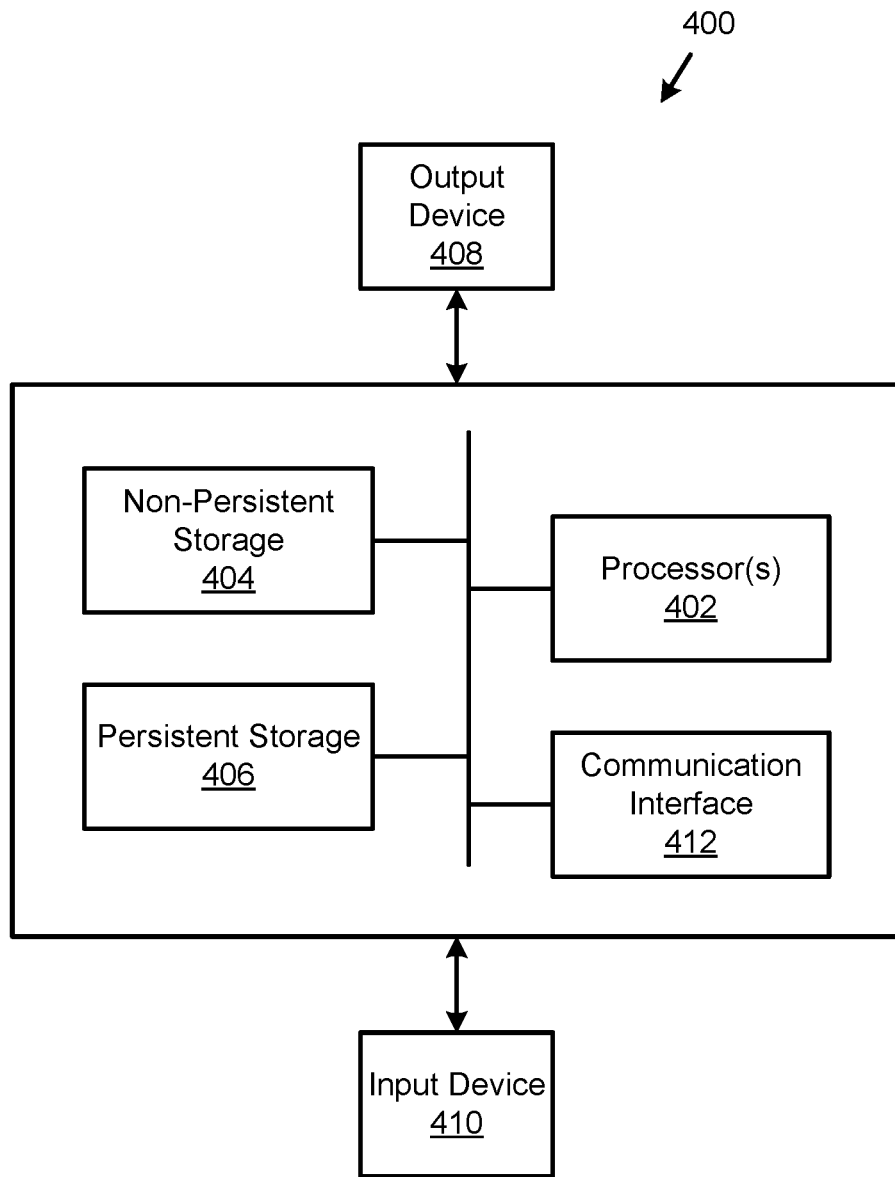
FIG. 4 shows a diagram of an exemplary computing device in accordance with one or more embodiments disclosed herein.

Embodiments disclosed herein may be implemented using computing devices and/or computing systems. FIG. 4 shows a diagram of an exemplary computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed throughout this disclosure should be understood as being examples of problems solved by embodiments disclosed herein and the embodiments disclosed herein should not be limited to solving the same/similar problems. The disclosed embodiments are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing pre-backup tasks, comprising:
    obtaining, by a proxy host, a snapshot request associated with an incremental backup of a file system stored in a network attached storage (NAS) from a backup manager;
    in response to obtaining the snapshot request:
        instantiating a NAS container to obtain a snapshot of the file system;
        providing the snapshot to the NAS container;
        after providing the snapshot to the NAS container:
            retrieving a previously generated slice list associated with the file system;
            identifying, using the slice list, changed data include in the file system;
            generating change rates associated with each slice;
            grouping the slices based on the change rates and group criteria to generate slice groups;
            generating an updated slice list specifying the slices and the slice groups; and
            providing the updated slice list to the backup manager.

2. The method of claim 1, wherein a slice of the slice groups comprises a portion of the file system.

3. The method of claim 2, wherein the slice comprises at least one selected from a group consisting of:
    a plurality of files; and
    a plurality of directories.

4. The method of claim 1, wherein the group criteria specifies a plurality of rules for grouping the slices to generate slice groups.

5. The method of claim 4, wherein the plurality of rules is configurable by a user.

6. The method of claim 4, wherein the plurality of rules specifies a plurality of ranges of change rates associated with each slice group of the slice groups.

7. The method of claim 6, wherein:
    a first slice group of the slice groups is associated with a first range of change rates of the plurality of ranges of change rates; and
    a second slice group of the slice groups is associated with a second range of change rates of the plurality of ranges of change rates.

8. A non-transitory computer readable medium comprising computer readable program code, which when executed by a computer processor enables the computer processor to perform a method for performing pre-backup tasks, the method comprising:
    obtaining, by a proxy host, a snapshot request associated with an incremental backup of a file system stored in a network attached storage (NAS) from a backup manager;
    in response to obtaining the snapshot request:
        instantiating a NAS container to obtain a snapshot of the file system;
        providing the snapshot to the NAS container;
        after providing the snapshot to the NAS container:
            retrieving a previously generated slice list associated with the file system;
            identifying, using the slice list, changed data include in the file system;
            generating change rates associated with each slice;
            grouping the slices based on the change rates and group criteria to generate slice groups;
            generating an updated slice list specifying the slices and the slice groups; and
            providing the updated slice list to the backup manager.

9. The non-transitory computer readable medium of claim 8, wherein a slice of the slice groups comprises a portion of the file system.

10. The non-transitory computer readable medium of claim 9, wherein the slice comprises at least one selected from a group consisting of:
    a plurality of files; and
    a plurality of directories.

11. The non-transitory computer readable medium of claim 8, wherein the group criteria specifies a plurality of rules for grouping the slices to generate slice groups.

12. The non-transitory computer readable medium of claim 11, wherein the plurality of rules is configurable by a user.

13. The non-transitory computer readable medium of claim 11, wherein the plurality of rules specifies a plurality of ranges of change rates associated with each slice group of the slice groups.

14. The non-transitory computer readable medium of claim 13, wherein:
a first slice group of the slice groups is associated with a first range of change rates of the plurality of ranges of change rates; and
a second slice group of the slice groups is associated with a second range of change rates of the plurality of ranges of change rates.

15. A system for performing pre-backup tasks, comprising:
a backup manager; and
a proxy host of a plurality of proxy hosts, comprising a processor and memory, programmed to:
obtain a snapshot request associated with an incremental backup of a file system stored in a network attached storage (NAS) from the backup manager;
in response to obtaining the snapshot request:
instantiate a NAS container to obtain a snapshot of the file system;
provide the snapshot to the NAS container;
after providing the snapshot to the NAS container:
retrieve a previously generated slice list associated with the file system;
identify, using the slice list, changed data include in the file system;
generate change rates associated with each slice;
group the slices based on the change rates and group criteria to generate slice groups;
generate an updated slice list specifying the slices and the slice groups; and
providing the updated slice list to the backup manager.

16. The system of claim 15, wherein a slice of the slice groups comprises a portion of the file system.

17. The system of claim 16, wherein the slice comprises at least one selected from a group consisting of:
a plurality of files; and
a plurality of directories.

18. The system of claim 15, wherein the group criteria specifies a plurality of rules for grouping the slices to generate slice groups.

19. The system of claim 18, wherein the plurality of rules is configurable by a user.

20. The system of claim 18, wherein the plurality of rules specifies a plurality of ranges of change rates associated with each slice group of the slice groups.

* * * * *